United States Patent [19]
Martin

[11] Patent Number: 5,833,402
[45] Date of Patent: Nov. 10, 1998

[54] REMOVABLE COPYING CUTTER

[75] Inventor: Philippe Roger Martin, Aubevoye, France

[73] Assignee: Societe Europeenne de Propulsion, Suresnes, France

[21] Appl. No.: 446,894

[22] Filed: May 17, 1995

[30] Foreign Application Priority Data

May 19, 1994 [FR] France ................................. 94 06104

[51] Int. Cl.$^6$ ............................... B23C 5/02; B23C 5/10
[52] U.S. Cl. .................................. 407/54; 279/86; 407/62
[58] Field of Search ......................... 407/53, 54, 61–63; 408/199, 277–230, 239 R; 279/79, 86

[56] References Cited

U.S. PATENT DOCUMENTS

| | | |
|---|---|---|
| 1,023,353 | 4/1912 | Anderson . |
| 2,367,597 | 1/1945 | Melbourne . |
| 2,612,377 | 9/1952 | Edens ........................................ 279/79 |
| 3,409,965 | 11/1968 | Fisher ........................................ 407/63 |
| 3,806,267 | 4/1974 | Vining, Jr. ................................. 279/86 |
| 5,203,653 | 4/1993 | Kudla ........................................ 407/63 |

FOREIGN PATENT DOCUMENTS

| | | |
|---|---|---|
| 0072887 | 3/1983 | European Pat. Off. . |
| 2647360 | 4/1978 | Germany . |

OTHER PUBLICATIONS

"End Mill Announced", Iron Age, vol. 190, No. 2, Jul. 12, 1962, p. 154.

*Primary Examiner*—Steven C. Bishop
*Attorney, Agent, or Firm*—Weingarten, Schurgin, Gagnebin & Hayes LLP

[57] ABSTRACT

The present invention relates to a copying cutter provided with a cylindrical or conical body having a spherical end, constituting the active portion of the cutter, said end including a plurality of flutes inclined at a determined angle θ relative to the longitudinal axis of the cutter and formed along circular arcs at a determined distance x from the midplane P of the cutter, an inside face and an outside face of each of the flutes constituting, after machining, respectively a cutting face and clearance faces of each tooth of the cutter.

The clearance faces comprise a first clearance face and an additional clearance face presenting at least a first facet. The cutting face has a cutting angle γ given by the following equation:

$$\gamma = \mathrm{Arcsin}[x \cdot \tan\theta / \sqrt{x(2R - x)}\,]$$

where R is the radius of the cutter. The present invention also relates to a method of manufacturing the cutter.

8 Claims, 8 Drawing Sheets

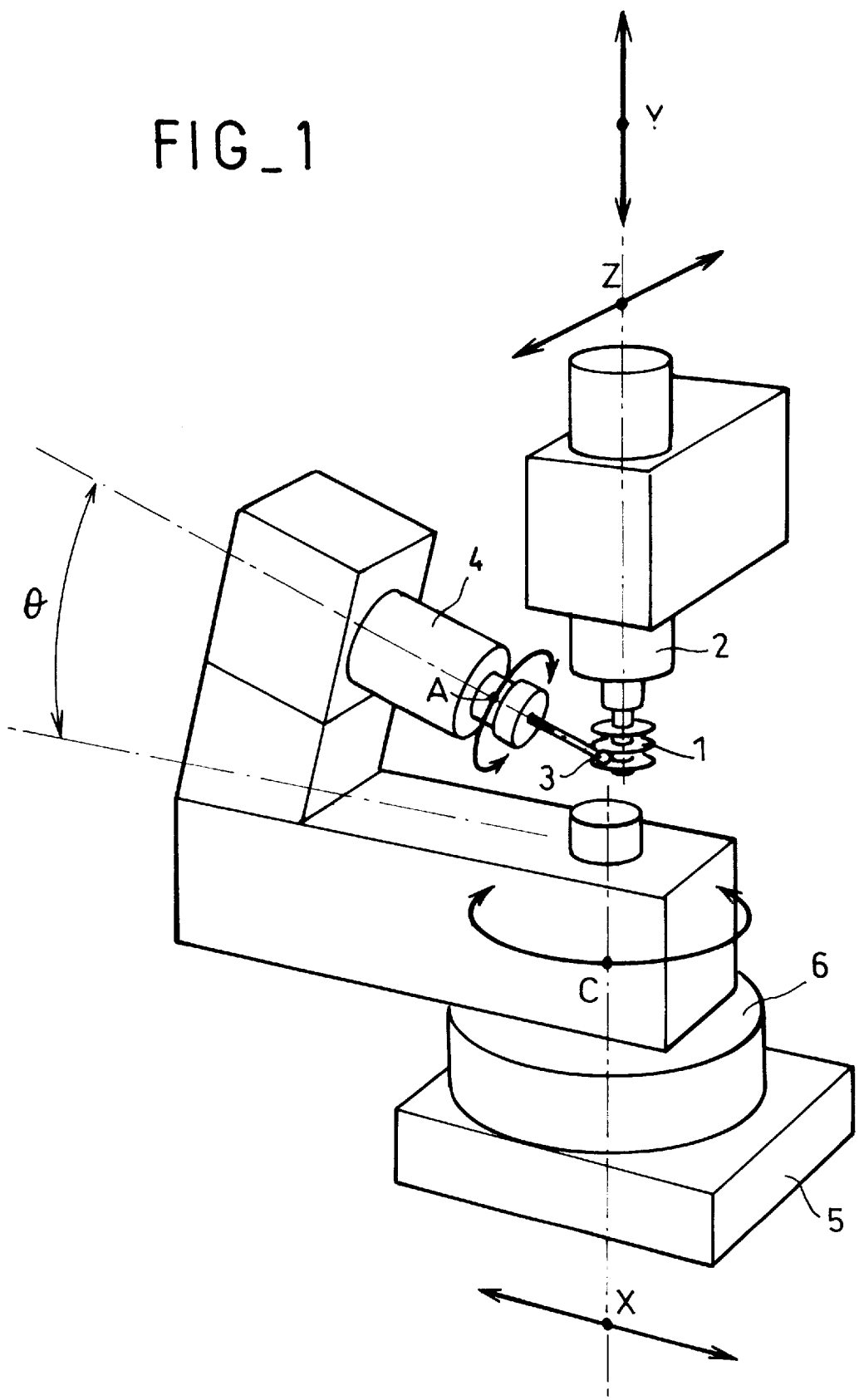
FIG_1

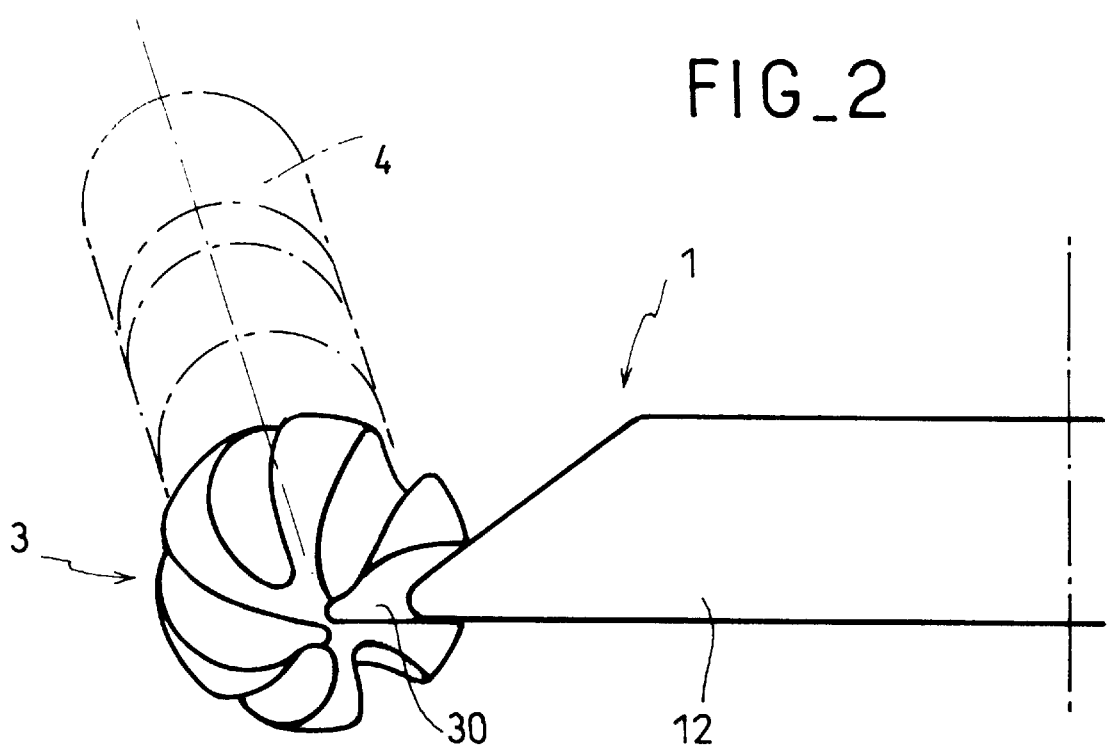
FIG_2
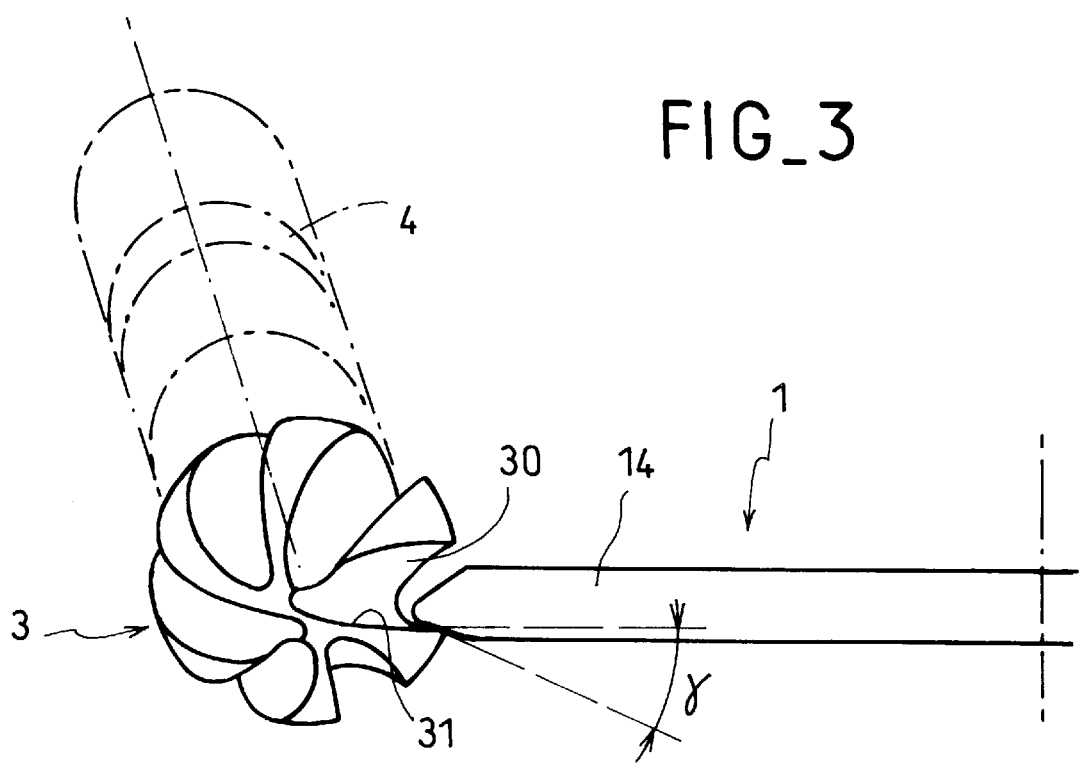
FIG_3

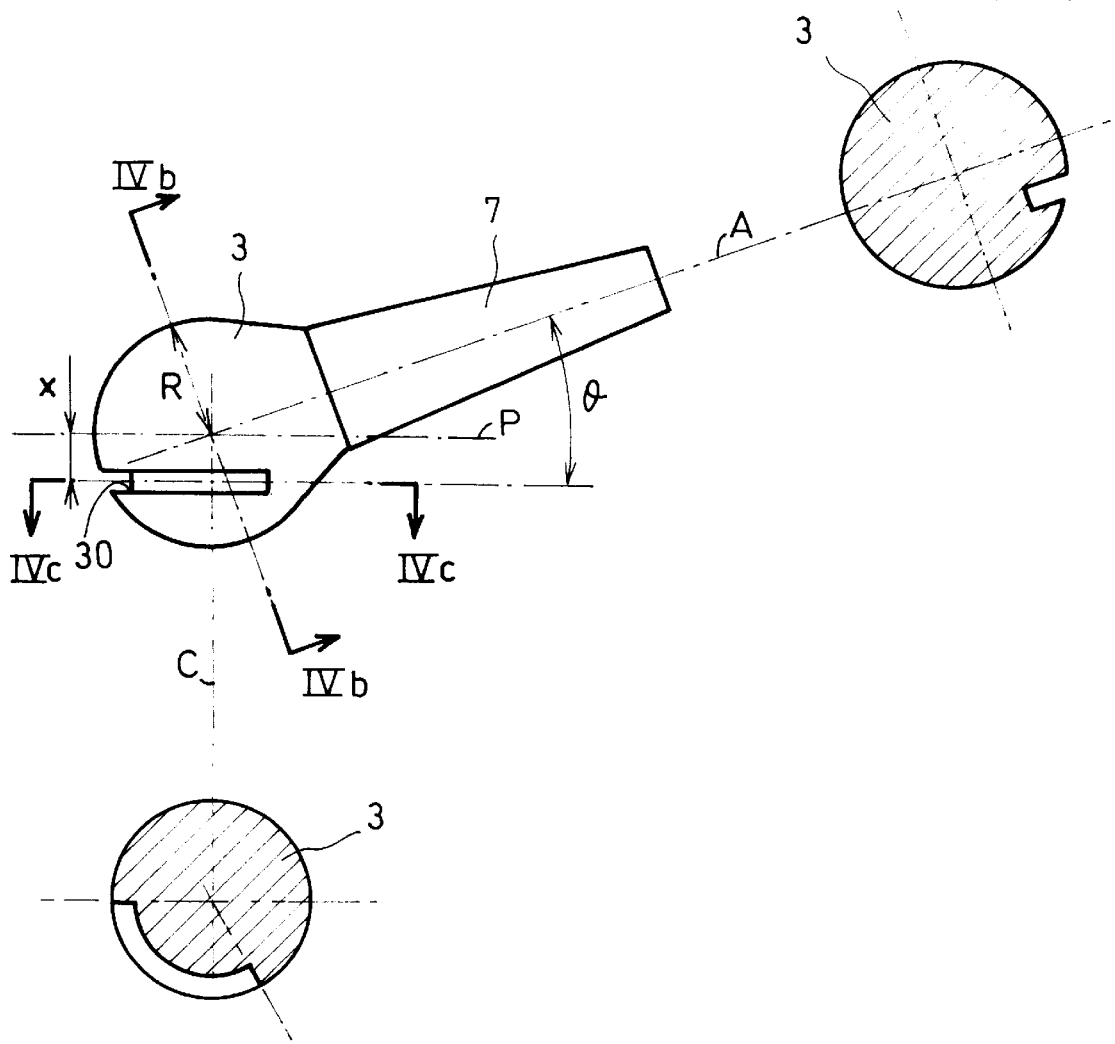

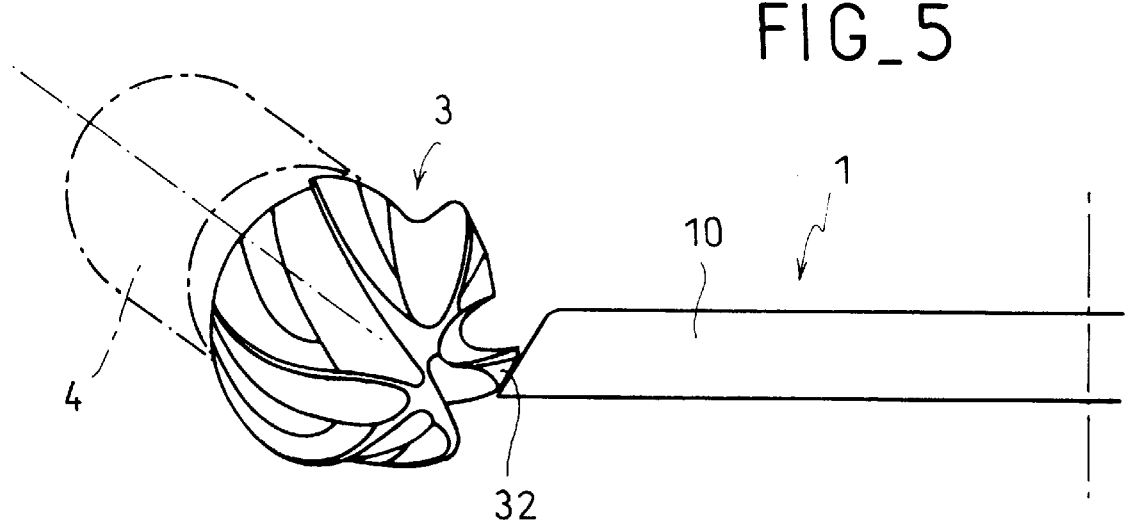
FIG_5
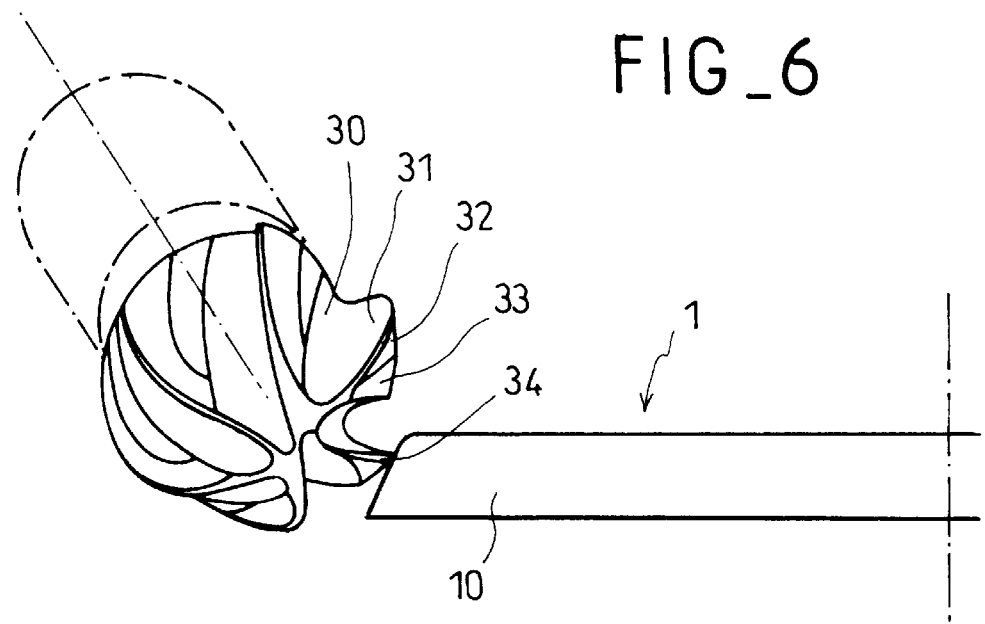
FIG_6

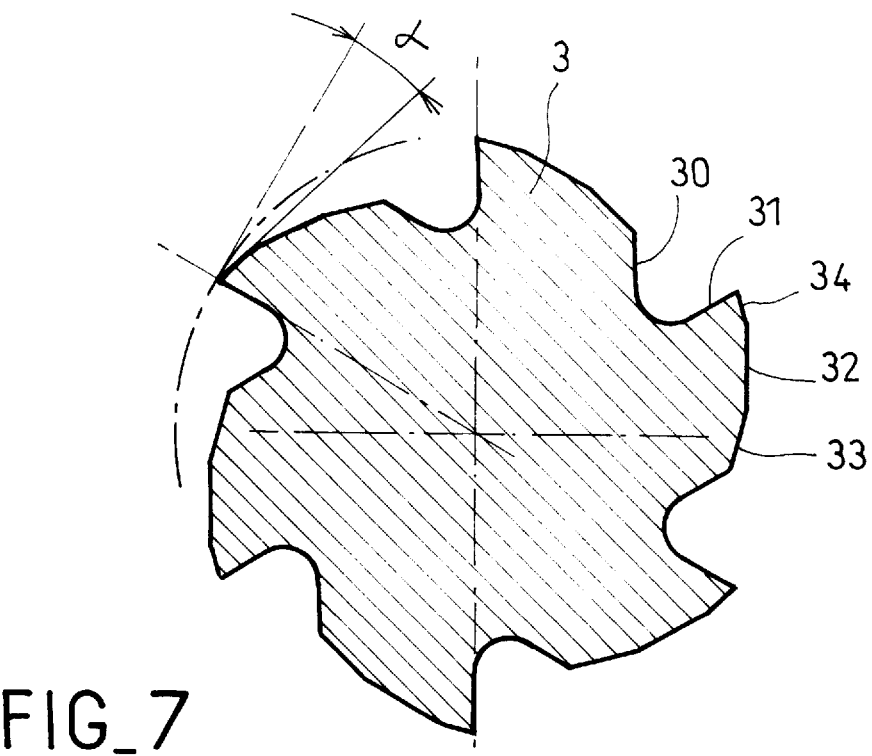
FIG_7
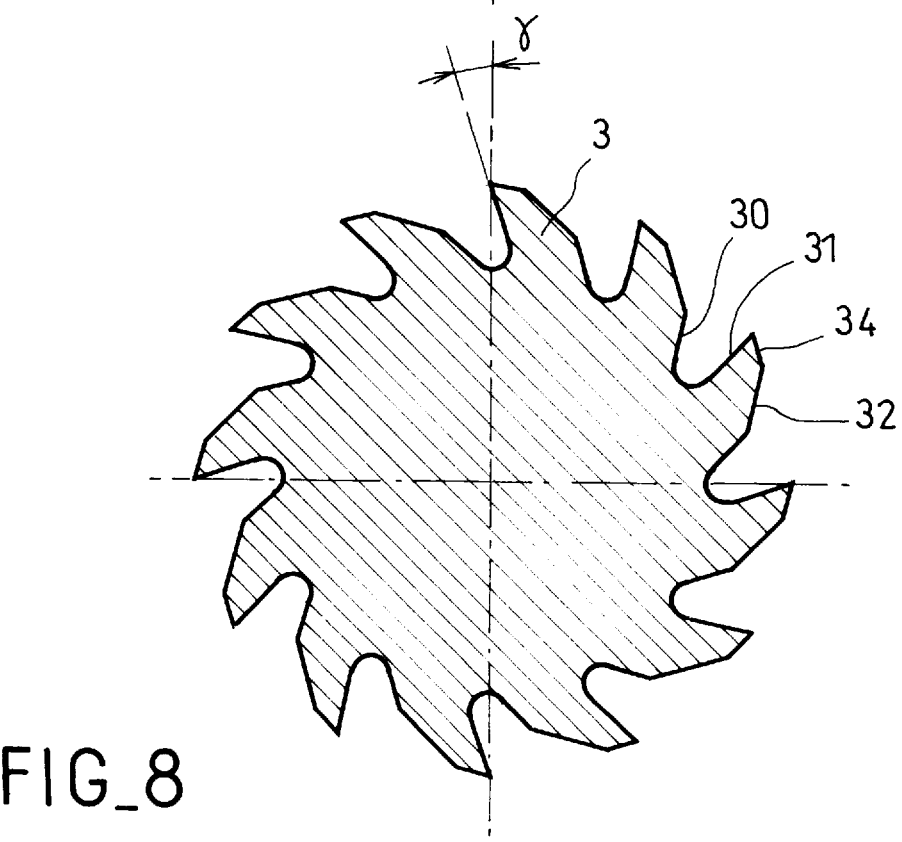
FIG_8

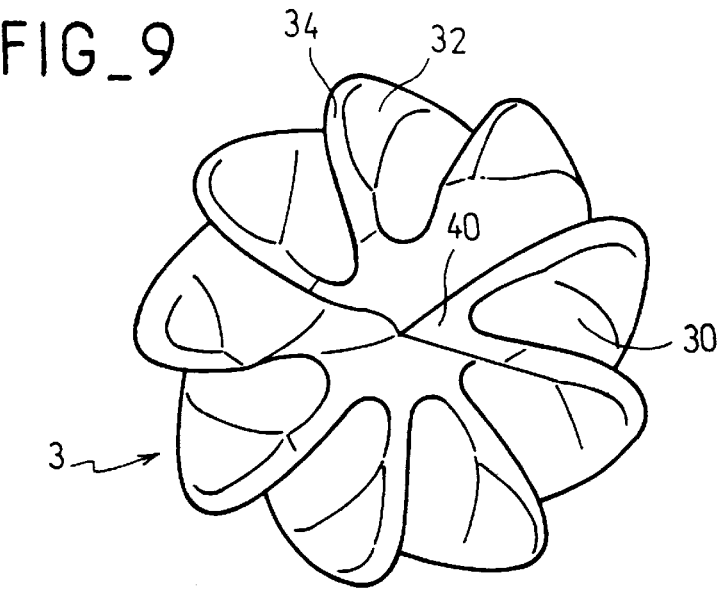
FIG_9
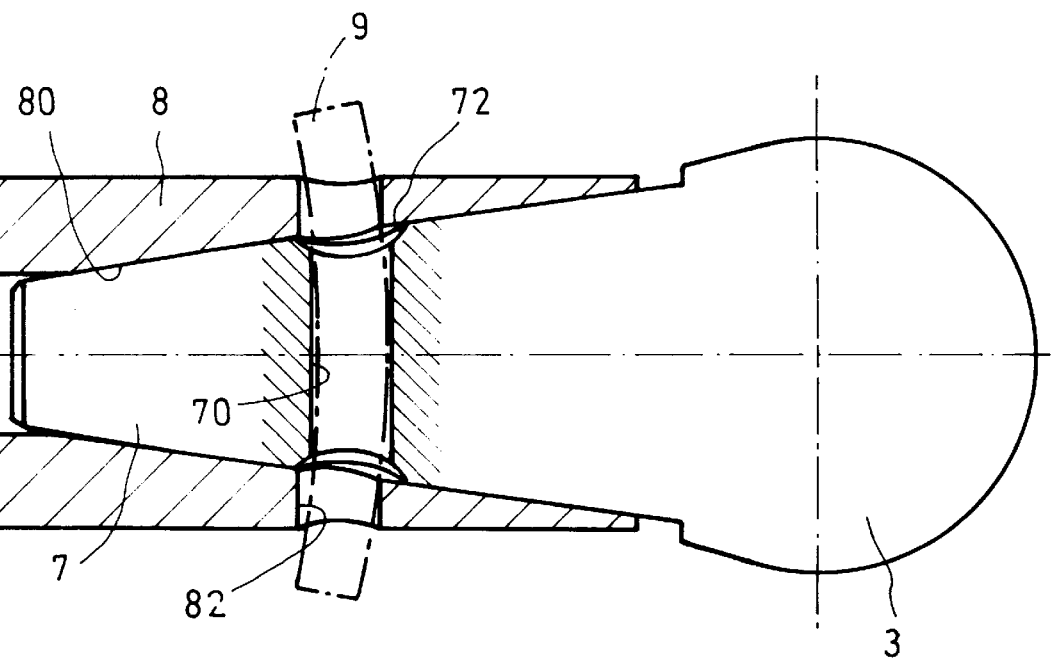
FIG 10

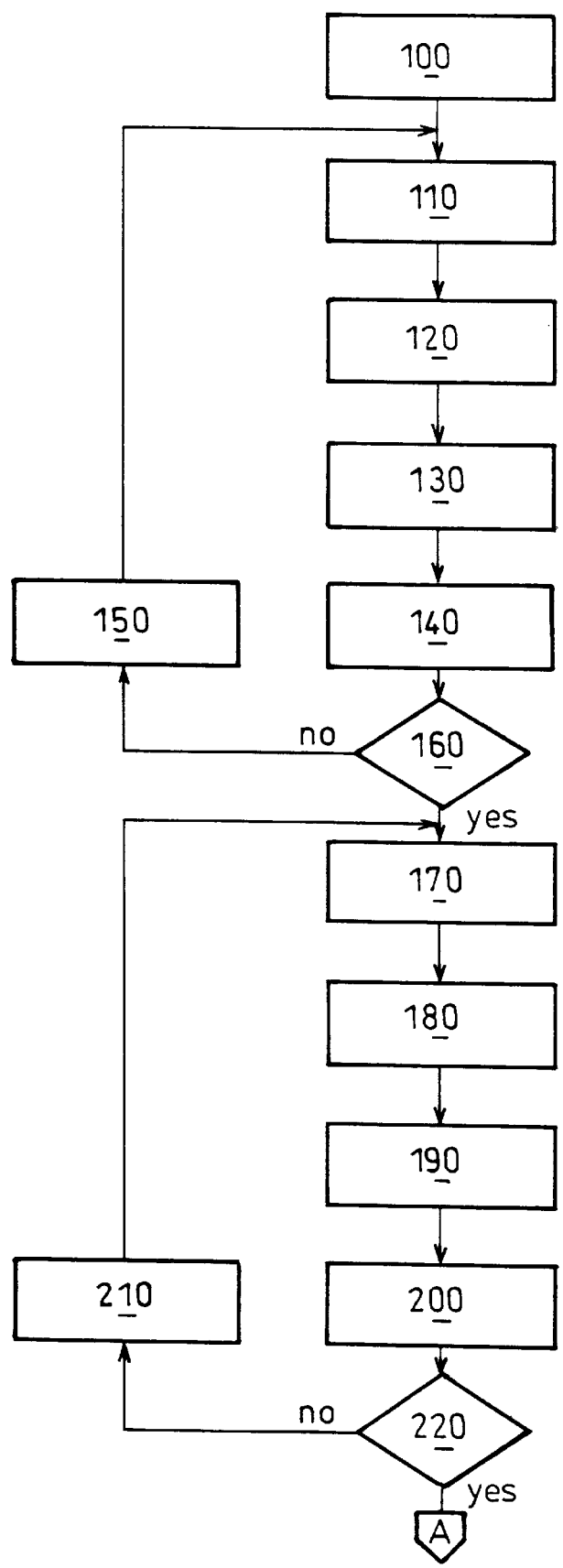
FIG_11_1

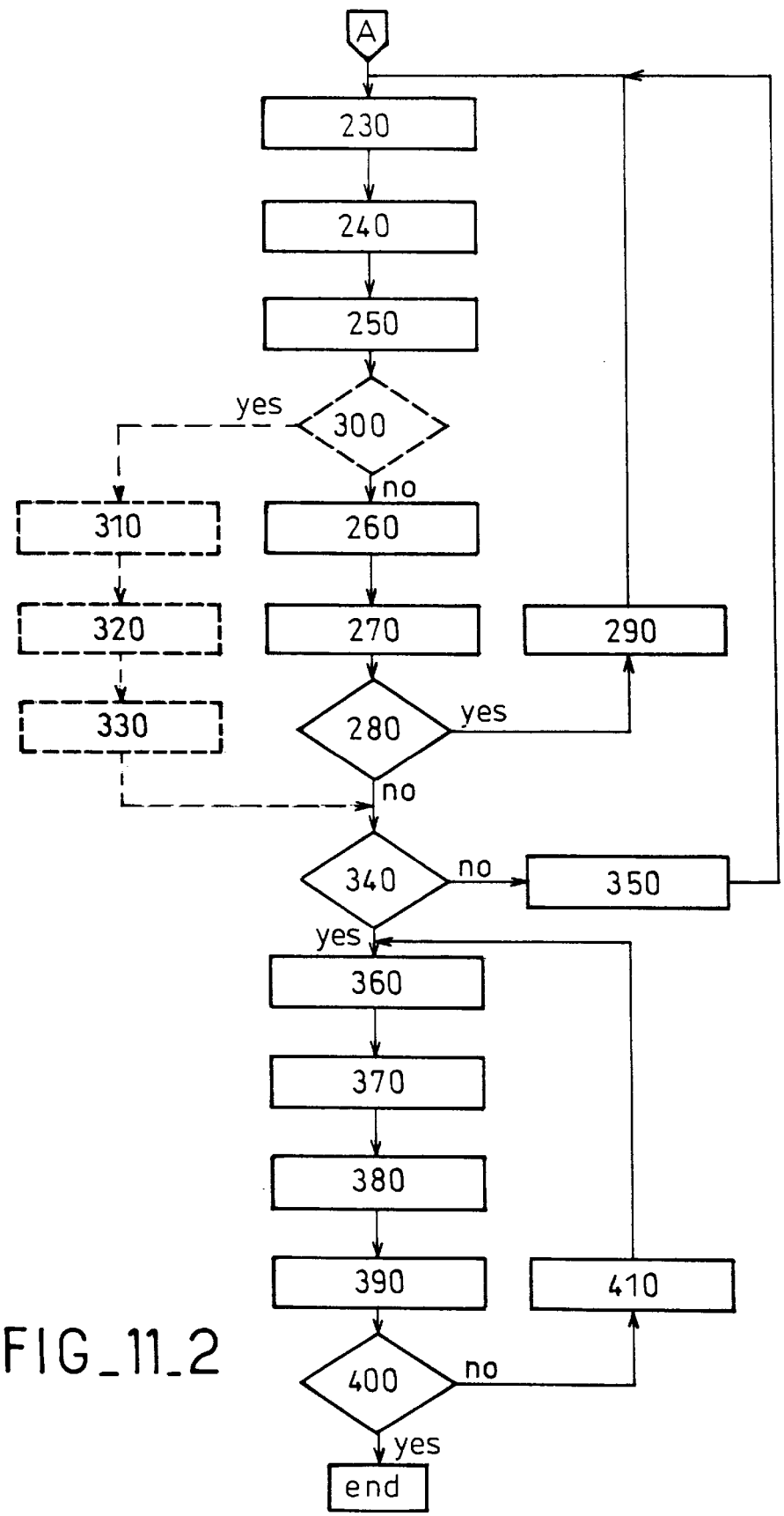
FIG_11_2

REMOVABLE COPYING CUTTER

TECHNICAL FIELD

The present invention relates to a copying cutter having a spherical end (a ball cutter), and more particularly a cutter for machining at great depths, for use on numerically controlled machine tools for reproducing parts that are complex in shape and difficult of access, such as the impellers of turbopumps in the fields of aviation or space, for example.

PRIOR ART

French patent application FR-2-433 998 shows an example of a ball-cutter that is in common use and including a plate having two cutting faces mounted in a fork of a tool carrier and held therein by a clamping screw.

French patent applications FR-2-624 416 and FR-2-548 061 describe cutters for reproduction purposes having respectively three blades disposed in the axial plane of the cutter and four plates constituted by sectors of a circular ring.

French application FR-2 541 155 shows a cutter having a hemispherical working head which includes two parallelogram-shaped plates and which possesses a top cutting surface that is convex.

In such tools having plates, material is cut successively by the lips of the various plates which are caused to remove a certain quantity of said material on each pass. This means that it is necessary to exert a determined force on each of said lips, which force can deflect the tool carrier and even to break it, should the tool become the seat of too much vibration. In addition, the shape of the plates makes it impossible to use angles that are normally favorable for cutting. In addition, it may be observed that in cutters provided with a clamping screw, as in the cutter of document FR-2-433 998, for example, a hammering phenomenon arises which leads inevitably to the tool carrier being destroyed.

DESCRIPTION OF THE INVENTION

The invention seeks to remedy the above-mentioned drawbacks in a copying cutter whose lifetime is not limited by the need to cut the plates. An object of the invention is to provide a cutter which is rigid and robust, thereby making intensive machining possible with large thicknesses of material being removed. Another object of the invention is to make such machining possible at high speeds of cutting and of advance. Yet another object is to simplify manufacture of a highly reliable copying cutter.

These objects are achieved by a copying cutter provided with a cylindrical or conical body having a spherical end constituting the active portion of the cutter, said end including a plurality of flutes inclined at a determined angle $\theta$ relative to the longitudinal axis of the cutter and formed along circular arcs at a determined distance x from the midplane P of the cutter, an inside face and an outside face of each of the flutes constituting, after machining, respectively a cutting face and clearance faces of each tooth of the cutter. The clearance faces comprise a first clearance face and an additional clearance face presenting at least a first facet.

By machining the spherical end directly in this way, which end has no additional parts added thereto, it is possible to obtain in highly repeatable manner a cutter that has a large number of teeth that present cutting angles which are particularly suitable for cutting purposes.

The cutting face has a cutting angle $\gamma$ given by the following equation:

$$\gamma = \operatorname{Arcsin}[x \cdot \tan\theta / \sqrt{x(2R - x)}\,]$$

where R is the radius of the cutter.

Thus, by adjusting the parameters $\theta$ and x, it is possible without difficulty to select the cutting angle $\gamma$ and the clearance angle $\alpha$ that are best suited to the couple constituted by the grinding tool and the material of the cutter.

Preferably, the flutes extend over an arc lying in the range 90° to 120° and the number of teeth (all of which converge towards the center) lies in the range six to twelve. When the cutter has an odd number of teeth, only one of the teeth extends all the way to the longitudinal axis of rotation of the cutter to ensure proper end machining.

In order to enable the cutter to be used for machining at great depths as well as at shallow depths, and also to make it possible to provide a better choice of materials for constituting the cutter (cutting qualities for its head and bending strength for its shank), the spherical end includes a conical shank for co-operating with a corresponding female conical portion of the cylindrical body, a fastener device passing through both the body and the shank to prevent any rotation between them. Advantageously, the fastener device is constituted by a resilient split pin.

The present invention also provides a method of manufacturing the active portion of a copying cutter having a spherical end as defined above, the longitudinal axis A of the cutter being inclined at a determined angle relative to the horizontal, the method comprising the following machining stages performed on a part that is formed with a spherical head and a conical shank:

a) a flute of determined depth is milled over a determined portion of the spherical head by rotating the cutter about an axis C perpendicular to the horizontal plane passing through the center of said spherical head;

b) the cutter is rotated through a predetermined angle about its own longitudinal axis A, depending on the number of teeth to be made in the cutter;

c) stages a) and b) are repeated for all of the teeth;

d) the cutting face of a flute is ground over a determined depth of an internal face thereof by rotating the cutter about the axis C, with the cutting angle $\gamma$ varying with a predetermined distance x that exists between the plane of the grinding tool and the midplane P of the cutter, including the center thereof;

e) the cutter is rotated through a determined angle about its longitudinal axis A, depending on the number of teeth to be made in the cutter;

f) stages d) and e) are repeated for all of the teeth;

g) a first facet of an additional clearance face is ground by rotating the cutter about the axis C;

h) the cutter is rotated through a determined angle about its own longitudinal axis A depending on the number of cutter teeth to be made;

i) stages g) and h) are repeated for all of the teeth;

j) a clearance face is ground by rotating the cutter about the axis C;

k) the cutter is rotated through a determined angle about its longitudinal axis A, depending on the number of cutter teeth to be made; and l) stages j) and k) are repeated for all of the teeth.

When the number of teeth is less than eight, as is preferable, then the method includes additional stages m) of rotating the cutter about its longitudinal axis A, and n) of grinding a second facet of the additional clearance face, said stages being implemented between above stages g) and h).

More precisely, the grinding stages d), g), j), and n) include a step of plunging the grinding tool into the cutter to be machined, the machining step proper during which the cutter is rotated, and a step of withdrawing the grinding tool and of returning it to its starting position.

BRIEF DESCRIPTION OF THE DRAWINGS

Other characteristics and advantages of the present invention appear more clearly from the following description given by way of non-limiting indication and made with reference to the accompanying drawings, in which:

FIG. 1 is a diagram showing the various displacement axes of a machine tool, as required for making a copying cutter of the invention;

FIG. 2 shows a first stage in the manufacture of the cutter of the invention;

FIG. 3 shows a second stage in the manufacture of the cutter of the invention;

FIG. 4a is a diagram for explaining how the cutting angle of the cutter of the invention is made;

FIGS. 4b and 4c are views respectively on sections IVb—IVb and IVc—IVc of FIG. 4a;

FIG. 5 shows a third stage in the manufacture of a cutter of the invention (making its cutting angle);

FIG. 6 shows the last stage in the manufacture of the cutter of the invention;

FIGS. 7 and 8 are cross-sections of the cutter on a plane perpendicular to its axis of rotation, relating respectively to a six-tooth cutter and to a twelve-tooth cutter;

FIG. 9 is an end view of a nine-tooth cutter of the invention;

FIG. 10 is an axial section showing how the tool is mounted on the tool carrier; and FIGS. 11_1 and 11_2 constitute a flow chart explaining the method of manufacturing the copying cutter of the invention.

DESCRIPTION OF PARTICULAR EMBODIMENTS

Reference is made to FIG. 1 which shows, in highly diagrammatical manner, a five-axis numerically controlled machine tool for making a copying cutter of the invention. The grinding tool 1 has three superposed grinding wheels 10, 12, and 14, and is mounted on a grinding wheel carrier 2 capable of moving along a vertical axis Y and a horizontal axis Z. The tool to be milled 3 (the ball-cutter) is mounted on a tool carrier 4 which serves to rotate the tool about its own longitudinal axis A and which is capable of moving along a translation axis X of a baseplate (carriage 5) of the machine tool. In conventional manner these four axes are suitable for enabling cylindrical tools to be cut having burr toothing or helical toothing, with displacement along the Y axis serving, in particular, to perform end grinding. An additional axis of rotation about an axis C perpendicular to the horizontal and passing through the center (or close to the center) of the cutter may also be used by means of a turntable 6 fixed on the carriage 5. As shown in FIG. 1, the tool carrier 4 is inclined relative to the horizontal plane of the baseplate at an angle θ, specifically to make it possible to machine a cutter that has a large number of teeth without the grinding tool 1 colliding with the shank of said tool.

FIGS. 2 and 11_1 show a first stage in the manufacture of a copying cutter of the invention which consists in digging flutes or channels 30. After initialization 100 of the various axes in order to enable the grinding tool 1 to come close to the cutter to be machined 3, a first step 110 is performed starting from said position during which the central grinding wheel 12 is plunged into the cutter 3 along the Z axis. During a second step 120, the flute is formed over a fraction of the cutter, advantageously extending over 90° to 120°, by rotating the cutter about the C axis. A third step 130 enables the tool 1 to be withdrawn along its Z axis, and in a fourth step 140, the cutter is returned to its starting position by further rotation about the C axis that is identical to the preceding rotation thereabout, but in the opposite direction. Finally, in a step 150, the cutter is rotated about its own axis A in order to enable another flute to be dug corresponding to another tooth of the cutter, by looping back through steps 110 to 140, said steps being performed as many times as there are teeth to be machined, which number is determined by a test performed at step 160.

FIGS. 3 and 11_1 show a second manufacturing stage that consists in reworking the cutting angle of the cutter by means of the bottom grinding wheel 14 (which reworking need be performed over a determined depth only of the flute). In a first step 170, the grinding wheel is inserted into the first flute 30, then in a second step 180 the cutting angle is formed on an inside face 31 of the entire flute by rotating the tool carrier 3 about the axis C. In step 190, the tool 1 is withdrawn along the Z axis and then the cutter is returned to its starting position by being rotated in the opposite direction about said axis C during a step 200. After the cutter has been rotated about the axis A in step 210, above steps 160 to 190 are repeated for each other tooth (where the number of teeth made depends on a test performed in step 220).

The advantage of having the tool carrier 4 for the cutter 3 inclined at an angle θ can be better understood from FIGS. 4a to 4c. It can thus be seen that with this inclination it is possible to make the flutes and the various facets of the cutter without fear of the grinding wheels of the grinding tool biting into the Morse taper cone or shank 7 of the cutter. In addition, this inclination makes it possible to select the most appropriate cutting and clearance angles for the substance that is to be worked. Thus, it can be shown very simply that, when the cutting plane of the grinding wheel passes through the center of the cutter (midplane P), if the axis of the cutting wheel turns through an angle $\phi$ in the anticlockwise direction, and the cutter is machined with an angle of inclination θ relative to the horizontal, then the cutting angle γ of the tooth relative to the cutter is then $\gamma = \phi + \text{Arcsin}(\tan\theta)$. Similarly, if the axis of the grinding wheel turns through an angle $\phi$ in the clockwise direction and the cutter is machined with an inclination θ relative to the horizontal, then the cutting angle γ of the tooth relative to the cutter will be $\gamma = \text{Arcsin}(\tan\theta) - \phi$. More generally, when the plane of the cutting wheel is at a distance x from the midplane P of the cutter (or radius R), it can also be shown that the cutting angle γ is then given by the following equation:

$$\gamma = \text{Arcsin}[x \cdot \tan\theta / \sqrt{x(2R - x)}] \pm \phi$$

FIGS. 5 and 11_2 show a third manufacturing stage consisting in milling facets of an additional clearance by means of the top grinding wheel 10. In a first step 230, the tool carrier 4 is rotated a first time about the axis C so as to make it possible during a step 240 to insert the grinding wheel as far as the end of the first tooth, and then in a second step 250 a first facet 32 of said additional clearance is made along the entire tooth by further rotation of the tool carrier 4 about the axis C (which rotation is performed in the opposite direction to the preceding rotation and in the same direction as the rotation of steps 120 and 180). In step 260, the grinding tool is withdrawn along its own Z axis and the cutter is returned to its initial position by reverse rotation about the same C axis in a step 270. Depending on the number of teeth to be made (as tested in step 280) (advantageously more than eight teeth), a second additional clearance facet 33 may then be cut, by looping again through steps 230 to 270, which steps are preceded by a step 290 during which the cutter is rotated about its own axis A.

In a variant implementation of the manufacturing method, as shown in dashed lines in FIG. 11_2, said second facet may be made directly during a cutter return step 320, which step follows a step 310 of the cutter initially being rotated about its axis A, with steps 260 to 280 then not being performed because of a step 300 following step 250 during which a test is performed concerning the number of teeth to be made. Thereafter, the system returns to its starting position by the grinding tool being withdrawn along the Z axis during a step 330.

In order to be able to machine the other teeth, a test is then performed at step 340 to enable the preceding steps from 230 and perhaps as far as 330 to be performed again after the cutter has been rotated about its A axis in step 350.

FIGS. 6 and 11_2 show the last stage in manufacturing the copying cutter of the invention (which stage is identical in theory to the first and second stages) consisting in machining the first clearance angle by means of the top grinding wheel 10. In a first step 360 the grinding wheel is inserted into the first flute 30, then in a second step 370 the first clearance angle 34 is made along the entire tooth by rotating the tool carrier 4 about the C axis. In step 380, the tool 1 is withdrawn along the Z axis and the cutter is returned to its starting position in a step 390 by being rotated in the opposite direction about the C axis. The above steps 360 to 390 are then repeated for the other teeth, after the cutter has been rotated in step 410 about its axis A, and depending on the result of a test performed in step 400, concerning the number of teeth that are to be made.

FIGS. 7 and 8 show cross-sections on a plane perpendicular to the longitudinal axis of the cutter 30 respectively through a six-tooth and through a twelve-tooth cutter as obtained using the above-described method of manufacture. In addition to the flutes 30, there can be seen therein the various faces of the cutter including its cutting face 31 which in FIG. 7 has a zero cutting angle γ (the angle γ being positive in FIG. 8), its first clearance 34 as defined by its clearance angle α, and its additional clearance facet(s) 32, 33. FIG. 9 is an end view of a nine-tooth cutter showing a central tooth 40 which extends all the way to the longitudinal axis of rotation of the cutter. Naturally, as before, there can be seen the flutes 30, the first clearance 34, and the additional clearances 32.

It is important to observe that if it is desired to make a copying cutter for deep penetration, it is necessary a priori to opt for a material having cutting qualities like those of tungsten carbide, for example, with cutters of this type being made in the form of single pieces including both the active portion of the tool, i.e. the ball-shaped end of the cutter, and its support part, i.e. the cutter shank. In the present invention, it is proposed (see FIG. 10) to make this type of copying cutter out of two separate parts, an active part that includes the cutter proper 3, together with its Morse taper shank 7, and a support part comprising a rod 8 provided with a female cone 80 for cooperating by force with the above-specified Morse taper. Thus, only the active portion needs to be made of a material having the cutting qualities required for machining purposes, and in particular tungsten carbide or high-speed steel (HSS), it being possible to make the support part out of a steel or a carbide of ordinary type that merely has good bending strength. Experience shows that high-speed steel (e.g. of M42 type) makes it possible to obtain swarf in smaller pieces, thereby requiring less torque, whereas, in contrast, carbide has good bending strength. The connection between the cones 7 and 80 is provided by means of a force-fit under determined prestress (e.g. 1 metric ton) that should nevertheless be small enough to remain within the elastic limit, with possible rotation between the cutter 3 and the rod 8 while cutting forces are engaged being avoided by adding a pin 9 that passes both through the rod via an orifice 82 and through the cutter shank via an orifice 70, the axes of the orifices 82 and 70 being offset by a distance that is determined as a function of the geometrical and mechanical characteristics of the selected pin. The pin is preferably constituted by a resilient split pin. The angle of the cones is determined in such a manner as to provide a compromise between wedging and positioning. Advantageously, the sharp edges 72 of the cutter shank orifice 70 are removed (de-burring) in order to facilitate penetration of the pin and prevent swarf being formed that might machine the pin.

In addition to making it possible to reduce the overall cost of the tool by limiting the use of special steels solely to the active portion of the tool, this two-part assembly also makes it possible to change the tool several times while continuing to use the same support rod.

It should be observed that such assembly is equally suitable for use while machining the cutter itself, and tests have shown that it is thus possible using a single rod to machine cutters in which repeatability of cutter dimensions is guaranteed. The cutter is machined on a short support where the cutter is held in place by conical abutment by means of a helical "bayonet" and a through pin. With this system it is possible to mill and to grind a substantially unlimited quantity of cutters. The reduced assembly time and the absence of adjustments as provided by this system facilitate mass production.

I claim:

1. A copying cutter provided with a cylindrical or conical body having a spherical end, wherein the spherical end constituting the active portion of the cutter includes a plurality of flutes, each of the plurality of flutes formed along a circular arc lying in a plane inclined at a determined angle θ relative to a rotational axis defined by the body of the cutter, the plane being parallel to and spaced a determined distance x from a midplane P passing through the radial center of the spherical end, each of the plurality of flutes further including an inside face and an outside face of each of the flutes constituting, after machining, respectively a cutting face and clearance faces for each tooth of the cutter.

2. A copying cutter according to claim 1, wherein said clearance faces comprise a first clearance face and an additional clearance face presenting at least a first facet.

3. A copying cutter according to claim 1, wherein said flutes extend over an arc lying in the range 90° to 120°.

4. A copying cutter according to claim 1, wherein said spherical end has six to twelve teeth all converging towards its center.

5. A copying cutter according to claim 4, wherein, when said spherical end has an odd number of teeth, only one of the teeth extends all the way to the longitudinal axis of rotation of the cutter.

6. A copying cutter according to claim 1, wherein said spherical end includes a conical shank for co-operating with a corresponding female conical portion of the cylindrical body, a fastener device passing through both the body and the shank to prevent any rotation between them.

7. A copying cutter according to claim 6, wherein said fastener device is constituted by a resilient split pin.

8. A copying cutter provided with a cylindrical or conical body having a spherical end, wherein the spherical end constituting the active portion of the cutter includes a plurality of flutes inclined at a determined angle $\alpha$ relative to a rotational axis defined by the body of the cutter and formed along circular arcs at a determined distance x from a midplane P passing through the radial center of the spherical end, wherein each of the plurality of flutes is parallel to a respective midplane P at a distance x therefrom, each of the plurality of flutes further including an inside face and an outside face of each of the flutes constituting, after machining, respectively a cutting face and clearance faces for each tooth of the cutter;

wherein said cutting face has a cutting angle Y given by the following equation:

$$\gamma = \mathrm{Arcsin}[x \cdot \tan\theta / \sqrt{x(2R-x)}\,]$$

where R is the radius of the cutter.

* * * * *

UNITED STATES PATENT AND TRADEMARK OFFICE
CERTIFICATE OF CORRECTION

PATENT NO. : 5,833,402
DATED : November 10, 1998
INVENTOR(S) : Philippe Roger Martin It is certified that error appears in the above-identified patent and that said Letters Patent is hereby corrected as shown below:

Column 7, line 13, claim 8, "angle α" should read --angle θ--.

Signed and Sealed this

Twelfth Day of October, 1999

Attest:

Q. TODD DICKINSON

*Attesting Officer*     *Acting Commissioner of Patents and Trademarks*